No. 861,777. PATENTED JULY 30, 1907.
J. P. STUART.
WHEEL.
APPLICATION FILED OCT. 26, 1905.
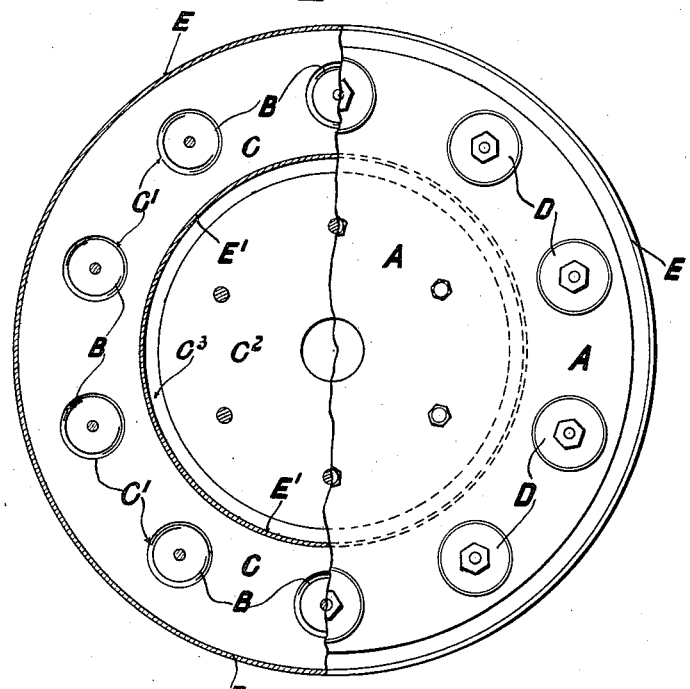
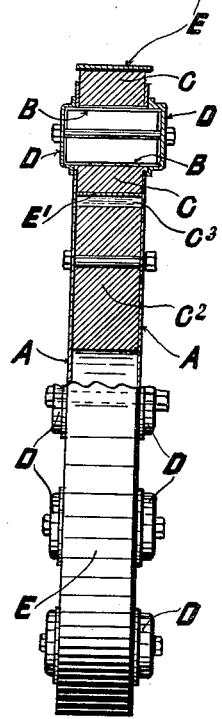
Witnesses.
H. L. Ames,
Inventor.
John Percival Stuart.
by Henry Orth Jr. atty.

UNITED STATES PATENT OFFICE.

JOHN PERCIVAL STUART, OF ADELAIDE, SOUTH AUSTRALIA, AUSTRALIA.

WHEEL.

No. 861,777.  Specification of Letters Patent.  Patented July 30, 1907.

Application filed October 26, 1905. Serial No. 284,564.

*To all whom it may concern:*

Be it known that I, JOHN PERCIVAL STUART, a subject of the King of Great Britain, residing at Steamship Buildings, No. 55 Currie street, Adelaide, in the State of South Australia and Commonwealth of Australia, engineer, have invented new and useful Improvements in Wheels for Vehicles, Velocipedes, and the Like, of which the following is a specification.

My invention relates to certain improvements in wheels for vehicles velocipedes and the like, and refers more particularly to that class in which springs are employed to afford an easy running.

The object of my invention is to provide a wheel in which the strain will be equalized, and the jarring action reduced to a minimum. I accomplish this object by employing the special combination and arrangement of two side plates or guides, mounted upon the wheel hub and incasing an outer movable ring or block for the tire or tread, in which is an arrangement of springs held in place by the side plates; and an inner fixed ring or block upon the wheel hub, with a space between the blocks in such manner as to afford in use a compensating and resilient action.

In order that my invention may be the better understood I will now proceed to describe the same with reference to the accompanying drawings in which—

Figure 1 is a side view partly in section of a wheel embodying my invention. Fig. 2 is an end view of the same partly in section.

In these drawings, A indicates the side plates or guides by which the various parts, of the wheel are maintained in position. These side plates or guides A preferably constructed of steel are mounted upon the wheel hub and arranged so as to form a casing for the whole wheel. The side plates A are circumferentially provided at intervals near their outer edges with a series of circular openings for the reception of protruding band, clock, or other springs B.

C is the outer ring or block—preferably of wood—in which corresponding circular openings C' are provided for the reception of the springs B. The springs B may be maintained in the circular openings C' by means of suitable casings, or caps D. The outer movable ring or block C is provided on its outer edge, which protrudes beyond the plates A, with a tire E of metal or rubber, and on its inner edge with a wearing plate E', preferably of steel. The ring or block C is adapted to slide between the two side plates or guides A, and when under pressure to compress the springs B. The inner ring or block $C^2$ is also preferably constructed of wood and may be fitted on the hub of the wheel and additionally fastened by means of bolts passing through the plates A. The rings or blocks C and $C^2$ are arranged so that there is a space $C^3$ between them which allows for the inward or sliding movement of the outer ring C when subjected to pressure.

By my invention the irregularities in compression are taken up by the springs B, the strain on the wheel is equalized and the jarring action reduced to a minimum.

I claim

1. A vehicle wheel comprising a circular block, a ring surrounding the block having a plurality of apertures therein, side plates smaller in circumference than the ring having apertures registering with the aforesaid apertures, a spring mounted in each aperture of the ring projecting into the apertures of the plates, means mounted on the plates to maintain the springs in the apertures and means connecting the plates.

2. A vehicle wheel comprising a circular block, a tread-ring surrounding the block having a plurality of apertures therein, a wearing plate on the inner edge of said ring, side plates smaller in circumference than the ring secured to the circular block and provided with apertures registering with the apertures of the ring, a spring mounted in each aperture of the ring projecting into the apertures of the plates, and removable caps mounted on the plates adapted to close the apertures.

In testimony whereof I have signed my name to this specification in the presence of two subscribing witnesses.

JOHN PERCIVAL STUART.

Witnesses:
CHAS. A. MURPHY,
CHARLES STANLEY BURGESS.